United States Patent
Lee et al.

(10) Patent No.: US 7,612,851 B2
(45) Date of Patent: Nov. 3, 2009

(54) METHOD OF MANUFACTURING A LIQUID CRYSTAL DISPLAY DEVICE

(75) Inventors: Sin-Doo Lee, Seoul (KR); Eun-Je Jang, Asan-si (KR); Hyung-Jun Song, Seoul (KR)

(73) Assignees: Samsung Electronics Co., Ltd. (KR); Seoul National University Industry Foundation (KR)

( * ) Notice: Subject to any disclaimer, the term of this patent is extended or adjusted under 35 U.S.C. 154(b) by 355 days.

(21) Appl. No.: 11/498,692

(22) Filed: Aug. 3, 2006

(65) Prior Publication Data

US 2007/0040973 A1     Feb. 22, 2007

(30) Foreign Application Priority Data

Aug. 18, 2005   (KR) ...................... 10-2005-0075509

(51) Int. Cl.
*G02F 1/141*     (2006.01)
(52) U.S. Cl. ...................................... 349/124; 349/125
(58) Field of Classification Search ................. 349/124, 349/125
See application file for complete search history.

(56) References Cited

U.S. PATENT DOCUMENTS

| | | | | |
|---|---|---|---|---|
| 5,646,482 | A | * | 7/1997 | Suzuki et al. ................ 313/582 |
| 5,730,637 | A | * | 3/1998 | Suzuki et al. ................. 445/49 |
| 6,419,540 | B1 | * | 7/2002 | Tanaka et al. ................. 445/24 |
| 6,762,396 | B2 | * | 7/2004 | Abbott et al. ................ 219/543 |
| 7,179,756 | B2 | * | 2/2007 | Yamazaki et al. ........... 438/780 |
| 2001/0003336 | A1 | * | 6/2001 | Abbott et al. ................ 219/543 |
| 2002/0034917 | A1 | * | 3/2002 | Tanaka et al. ................. 445/24 |
| 2002/0036466 | A1 | * | 3/2002 | Tanaka et al. ................ 313/586 |
| 2002/0187567 | A1 | * | 12/2002 | Yamazaki et al. ............. 438/11 |
| 2003/0121906 | A1 | * | 7/2003 | Abbott et al. ................ 219/543 |
| 2004/0061433 | A1 | * | 4/2004 | Izuno et al. .................. 313/498 |
| 2005/0211384 | A1 | * | 9/2005 | Hayashi .................. 156/345.47 |
| 2006/0033080 | A1 | * | 2/2006 | Harada et al. .......... 252/301.16 |
| 2006/0267042 | A1 | * | 11/2006 | Izuno et al. .................. 257/100 |
| 2007/0092696 | A1 | * | 4/2007 | Tsukatani et al. ........... 428/148 |

* cited by examiner

*Primary Examiner*—K. C. Kianni
(74) *Attorney, Agent, or Firm*—Cantor Colburn LLP

(57) ABSTRACT

A method of manufacturing a liquid crystal display (LCD) device is provided. In the method, a vertical alignment layer having a first area and a second area is formed on a substrate. A first plasma gas is sprayed onto the first area with first spraying conditions under atmospheric pressure. A second plasma gas is sprayed onto the second area with second spraying conditions under atmospheric pressure.

5 Claims, 23 Drawing Sheets

3TIMES,0V

2TIMES, 3V

METHOD OF MANUFACTURING A LIQUID CRYSTAL DISPLAY DEVICE

This application claims priority to Korean Patent Application No. 2005-75509 filed on Aug. 18, 2005 and all the benefits accruing therefrom under 35 U.S.C. §119, the contents of which are herein incorporated by reference in its entirety.

BACKGROUND OF THE INVENTION

1. Field of the Invention

The present invention relates to a method of manufacturing a liquid crystal display device. More particularly, the present invention relates to a method of forming an alignment layer of a liquid crystal display device.

2. Description of the Related Art

In general, an alignment layer of a liquid crystal display (LCD) device is formed by rubbing an organic layer with a rubbing cloth. However, the organic layer directly makes contact with the rubbing cloth to cause static electricity and/or impurities, and the static electricity and/or the impurities causes a malfunction of an electrical circuit and/or deteriorate alignment uniformity. Furthermore, in the rubbing method using a rubbing cloth, adjusting a pretilt angle of a liquid crystal molecule and/or finely arranging alignment is difficult so that there are limits to forming a multi-domain alignment. In order to prevent the above-mentioned problems, a photo-alignment method has been developed. However, stability, such as thermal stability of a photosensitive polymer of the photo-alignment method decreases as time goes by so that reliability of the alignment becomes low. Also, the photo-alignment method needs a light source requiring large amounts of energy. Thus, the photo-alignment method is not practically used.

Recently, active research has been conducted on an ion-beam alignment method, wherein an ion beam is irradiated onto the alignment layer. The ion-beam alignment method has merits, as described below. That is, the ion-beam alignment method may be applied to a conventional organic alignment layer of polyimide, so that a new alignment layer is not required. Furthermore, a pretilt angle of a liquid crystal molecule may be adjusted by an ion beam with low energy. However, the adjustment of a pretilt angle of a liquid crystal molecule is limited to vertical alignment, and successive variations of a pretilt angle are very difficult to perform. Furthermore, the ion-beam alignment method requires a vacuum chamber for generating and irradiating an ion beam.

BRIEF SUMMARY OF THE INVENTION

An exemplary embodiment of a method of manufacturing a liquid crystal display device includes spraying a plasma gas onto an alignment layer.

An exemplary embodiment of a method of manufacturing a liquid crystal display device may include disposing a mask, through which an area of the alignment layer is exposed, and spraying the plasma gas onto the area exposed through the mask.

An exemplary embodiment of a method of manufacturing a liquid crystal display device may include spraying the plasma gas onto a vertical alignment layer with spraying conditions different from each other.

An exemplary embodiment provides a method of manufacturing a liquid crystal display (LCD) device capable of forming an alignment layer under atmospheric pressure without making direct contact with a rubbing cloth.

In an exemplary embodiment, there is provided a method of manufacturing an LCD device. In the method, a vertical alignment layer having a first area and a second area is formed on a substrate. A first plasma gas with first spraying conditions is sprayed onto the first area under atmospheric pressure. A second plasma gas with second spraying conditions is sprayed onto the second area under atmospheric pressure.

In an exemplary embodiment, there is provided a method of manufacturing an LCD device. In the method, a vertical alignment layer is formed on a substrate. Plasma gas is sprayed onto a portion of the vertical alignment layer under atmospheric pressure. Plasma gas is sprayed onto the whole vertical alignment layer under atmospheric pressure.

In another exemplary embodiment, there is provided a method of manufacturing an LCD device. In the method, a first vertical alignment layer having a first area and a second area is formed on a lower substrate having a pixel electrode. A first plasma gas with first spraying conditions is sprayed onto the first area under atmospheric pressure. A second plasma gas with second spraying conditions is sprayed onto the second area under atmospheric pressure. A second vertical alignment layer having a third area and a fourth area is formed on an upper substrate having a common electrode. A third plasma gas with third spraying conditions is sprayed onto the third area under atmospheric pressure. A fourth plasma gas with fourth spraying conditions is sprayed onto the fourth area under atmospheric pressure. A liquid crystal layer is disposed between the lower substrate and the upper substrate, such that the first area faces the third area, and the second area faces the fourth area.

In an exemplary embodiment, the first spraying conditions are substantially the same as the fourth spraying condition. In another exemplary embodiment the first spraying conditions are substantially the same as the third spraying conditions.

In an exemplary embodiment, the substrate may include a plurality of pixel areas and both the first area and the second area may be disposed in each of the pixel areas.

In exemplary embodiments, spraying conditions may include the number of plasma gas particles sprayed onto a unit area, a spraying time, a spraying direction, a spraying intensity, a spraying velocity, a moving velocity of the substrate, a spraying distance, etc. The spraying conditions may vary according to a distance between a releasing part from which the plasma gas is sprayed and the alignment layer onto which the plasma gas is sprayed, an angle between a spraying direction of the plasma gas and an upper surface of the substrate, and the number of plasma gas sprays.

BRIEF DESCRIPTION OF THE DRAWINGS

The above and other advantages of the present invention will become readily apparent by reference to the following detailed description when considered in conjunction with the accompanying drawings wherein.

DETAILED DESCRIPTION OF THE INVENTION

Figure 1:
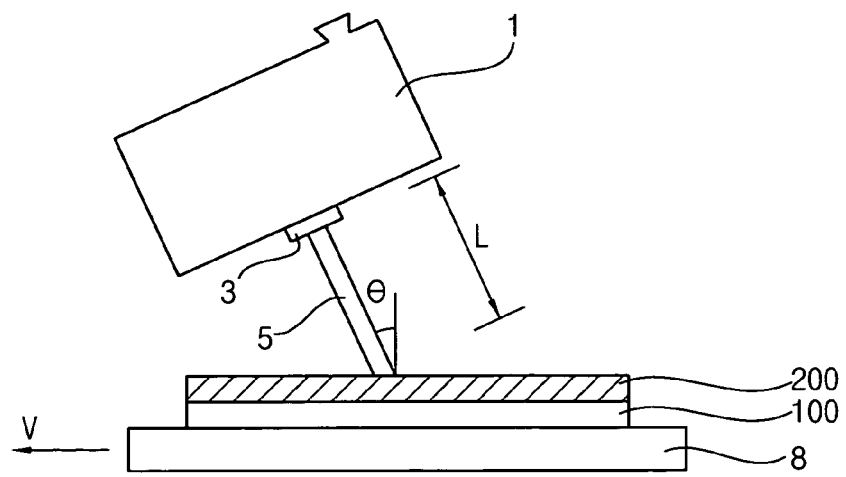
FIG. 1 is a cross-sectional view illustrating an exemplary embodiment of a method of manufacturing a liquid crystal display (LCD) device according to the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the sizes and relative sizes of layers and regions may be exaggerated for clarity.

It will be understood that when an member or layer is referred to as being "on" or "connected to" another member or layer, it can be directly on or connected to the other member or layer or intervening members or layers may be present. In contrast, when an member is referred to as being "directly on" or "directly connected to" another member or layer, there are no intervening members or layers present. Like numbers refer to like members throughout. As used herein, the term "and/or" includes any and all combinations of one or more of the associated listed items.

It will be understood that, although the terms first, second, etc. may be used herein to describe various members, components, regions, layers and/or sections, these members, components, regions, layers and/or sections should not be limited by these terms. These terms are only used to distinguish one member, component, region, layer or section from another region, layer or section. Thus, a first member, component, region, layer or section discussed below could be termed a second member, component, region, layer or section without departing from the teachings of the present invention.

Spatially relative terms, such as "lower," "upper" and the like, may be used herein for ease of description to describe one member or feature's relationship to another member(s) or feature(s) as illustrated in the figures. It will be understood that the spatially relative terms are intended to encompass different orientations of the device in use or operation in addition to the orientation depicted in the figures. For example, if the device in the figures is turned over, members described as "lower" relative to other members or features would then be oriented "upper" the other members or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, members, and/or components, but do not preclude the presence or addition of one or more other features, integers, steps, operations, members, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a cross-sectional view illustrating an exemplary embodiment of a method of manufacturing a liquid crystal display (LCD) device according to the present invention.

Referring to FIG. 1, an apparatus 1 forms plasma gas 5 to be sprayed onto a substrate 100. In exemplary embodiments, a source gas of the plasma gas may include, but is not limited to, nitrogen gas, an inert gas such as helium gas, neon gas, a mixture thereof, etc. In an exemplary embodiment, radio frequency (RF) power is applied to the source gas to form the plasma gas 5. The plasma gas 5 is sprayed onto an alignment layer 200 through a releasing part 3 under an atmospheric pressure. In an exemplary embodiment, the releasing part 3 may have a slit shape The plasma gas 5 is sprayed onto the alignment layer 200 formed on the substrate 100 to form an LCD device. The substrate 100 is disposed on a base 8.

When the plasma gas 5 is sprayed, a spraying velocity of the plasma gas 5, a moving velocity V of the substrate 100, a moving direction of the substrate 100, a spraying angle θ between a direction perpendicular to an upper surface of the substrate 100 and a spraying direction of the plasma gas 5 and a spraying distance L between the releasing part 3 and a portion of the substrate 100 onto which the plasma gas 5 is sprayed, may be varied. Varying the above-mentioned conditions affects alignment characteristics of a liquid crystal molecule on the alignment layer.

A cross-section of the releasing part 3 may have various shapes. The cross-section of the releasing part 3 may have a predetermined shape to spray the plasma gas 5 onto a predetermined area of the substrate 100, which corresponds to the predetermined shape. In exemplary embodiments, the cross-section of the releasing part 3 may have a shape such as a square, a rectangle, a polygon, a circle, an oval, a polygon of which an edge is rounded, etc. The apparatus 1 for forming plasma gas may include at least two of releasing parts. In an exemplary embodiment with at least two releasing parts 3, a shape of cross-sections of each of the releasing parts may be different from each other of may be the same. A disposition or a releasing angle of the releasing part 3 may be adjusted to adjust the spraying angle θ between a direction perpendicular to the upper surface of the substrate 100 and the spraying direction of the plasma gas 5.

In an exemplary embodiment, the plasma gas 5 may be sprayed by a blasting method using a gas such as an inert gas, nitrogen gas, etc. In another exemplary embodiment, the plasma gas 5 may be sprayed onto the substrate 100 by using an electric field or a magnetic field.

In exemplary embodiments, the alignment layer 200 may include a polymer compound such as polyimide, lecithin, etc. or an inorganic compound such as diamond-like carbon (DLC), etc. The alignment layer 200 may be uniformly formed on the whole substrate 100 or be formed on a portion of the substrate 100 excluding a pad area and/or a peripheral area of the substrate 100.

The substrate 100 may include, but is not limited to, glass, quartz, polymer resin, etc. The substrate 100 may include a circuit line, a pad, an electrode, a switching device, a driving circuit, etc. A disposition (or a releasing angle) between the substrate 100 and the plasma gas 5 sprayed onto the substrate 100 may relatively vary. In an exemplary embodiment, the plasma gas 5 may be sprayed onto the substrate 100 from the releasing part 3 secured at a predetermined position, and the substrate may move in a predetermined direction with a velocity.

Figure 2A:
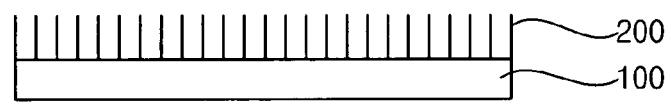
FIGS. 2A and 2B are cross-sectional views illustrating exemplary embodiments of surface characteristics of the alignment layer illustrated in FIG. 1 before and after the plasma gas is sprayed onto the alignment layer, respectively.
Figure 2B:

FIGS. 2A and 2B are cross-sectional views illustrating exemplary embodiments of surface characteristics of the alignment layer illustrated in FIG. 1 before and after the plasma gas is sprayed onto the alignment layer. FIG. 2A is a cross-sectional view illustrating surface characteristics of the alignment layer before the plasma gas is sprayed onto the alignment layer. FIG. 2B is a cross-sectional view illustrating surface characteristics of the alignment layer after the plasma gas is sprayed onto the alignment layer.

Referring to FIGS. 2A and 2B, a surface of a vertical alignment layer 200 is plasma-gas treated so that a liquid crystal molecule on the alignment layer 200 has a pretilt angle.

In FIGS. 2A and 2B, an alignment layer 200 is illustrated as a vertical line or a tilt line in order to distinguish a vertical alignment layer from a tilt alignment layer. Thus, the vertical line and the tilt line are schematic shapes for clarity.

A liquid crystal molecule on a vertical alignment layer 200 is vertically aligned by an interaction of the liquid crystal molecule and the vertical alignment layer 200. Plasma gas 5 is sprayed onto the vertical alignment layer 200 (FIG. 2A) to form a tilt alignment layer (FIG. 2B) so that a liquid crystal molecule is tilted on the tilt alignment layer. A pretilt angle of the liquid crystal molecule may be varied according to spraying conditions of the plasma gas 5.

FIGS. 3A to 3H are photographs showing exemplary embodiments of alignment characteristics of an LCD device, which vary according to the number of plasma gas sprays.

Referring to FIGS. 3A to 3H, spraying conditions, such as a spraying angle of plasma gas, a spraying intensity, a moving velocity of a substrate, etc., were fixed, and the number of the plasma gas sprays was varied so that a variation of characteristics of an alignment layer according to a spraying time was measured.

In an exemplary embodiment, after an alignment layer was formed on an upper substrate having an electrode formed thereon, lower substrates were prepared. The numbers of plasma gas sprays of each of the lower substrates were different from each other. An LCD panel including the lower substrate, the upper substrate having the alignment layer and a liquid crystal layer was manufactured. A lower polarizing plate and a backlight unit, etc. were disposed under the LCD panel, and an upper polarizing plate, etc. was disposed on the LCD panel to form an LCD device. A transmitting axis of the lower polarizing plate was substantially perpendicular to a transmitting axis of the upper polarizing plate. Plasma gas was sprayed onto the upper substrate under spraying conditions substantially the same as the lower substrate. According to a disposition of the electrode, a liquid crystal molecule of the liquid crystal layer may have a positive dielectric anisotropy or a negative dielectric anisotropy.

Particularly, the alignment layer was JALS-684 (a product manufactured by JSR Corp., Japan), which was a polyimide-based vertical alignment layer. A radio frequency alternative electric field was applied to argon gas to form the plasma gas. The plasma gas was sprayed repeatedly onto the substrate under conditions of about 2 millimeters (mm) of a spraying distance and about 17 degrees of a spraying angle with respect to a normal line of the substrate. EN-37 (a product manufactured by Chisso Petrochemical Corp., Japan) having negative dielectric anisotropy was used as the liquid crystal of the liquid crystal layer.

FIGS. 3A to 3D show a brightness of an LCD device when 0 V was applied to the LCD device. A brightness of the LCD device increases when the number of plasma gas sprays increases (2 times in FIG. 3A to 5 times in FIG. 3D). A liquid crystal molecule vertically aligned by a vertical alignment layer was gradually horizontally aligned when the number of plasma gas sprays increased.

The transmitting axis of the lower polarizing plate is substantially perpendicular to the transmitting axis of the upper polarizing plate. Thus, when the liquid crystal layer does not affect polarizing characteristics of a light passing through the liquid crystal layer, the LCD device becomes dark because no light passes through the upper polarizing plate. When the liquid crystal layer affects polarizing characteristics of a light passing through the liquid crystal layer, the LCD device becomes bright because light can pass through the upper substrate.

When a liquid crystal molecule is vertically aligned, the liquid crystal molecule does not affect polarizing characteristics of a light passing through the liquid crystal layer and the LCD device becomes dark because no light passes through the upper polarizing plate. However, when a liquid crystal molecule is horizontally aligned, the liquid crystal molecule affects polarizing characteristics of a light passing through the liquid crystal layer and the LCD device becomes bright because light can pass through the upper substrate. Thus, alignment characteristics of a liquid crystal molecule vary from a vertical alignment to a horizontal alignment in proportion to the number of plasma gas sprays.

Figure 3A:
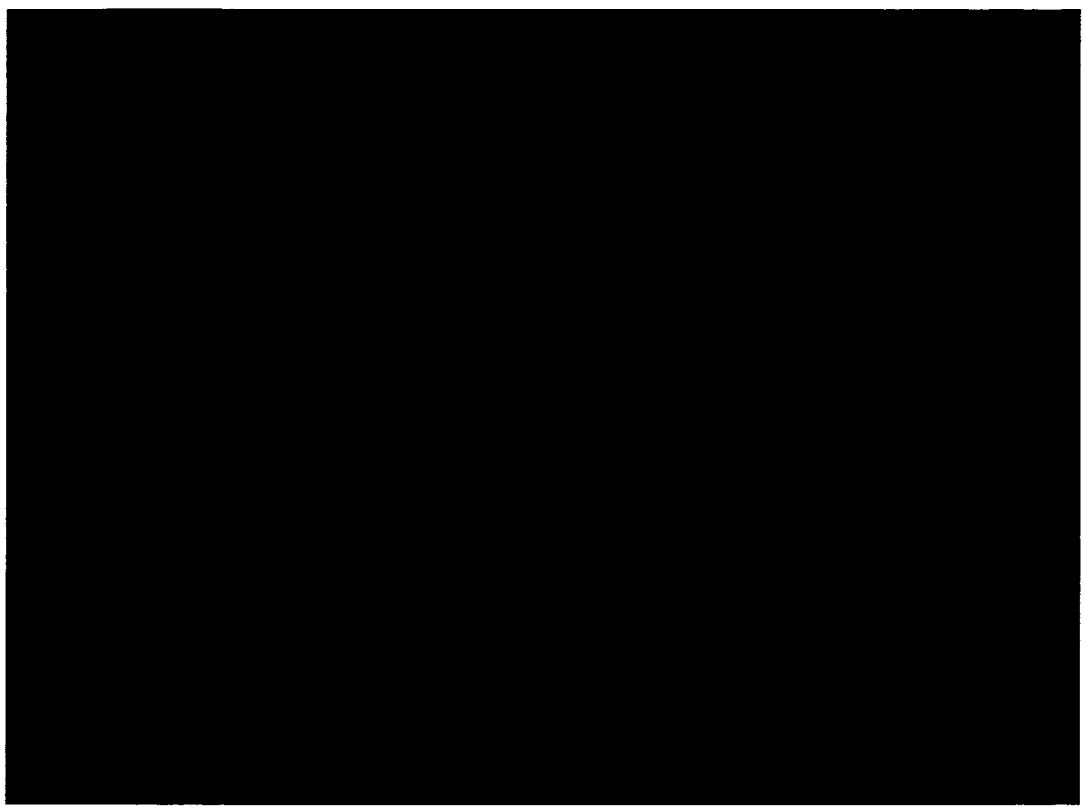
FIGS. 3A to 3H are photographs showing exemplary embodiments of alignment characteristics of an LCD device, which vary according to the number of plasma gas sprays.
Figure 3B:
Figure 3C:
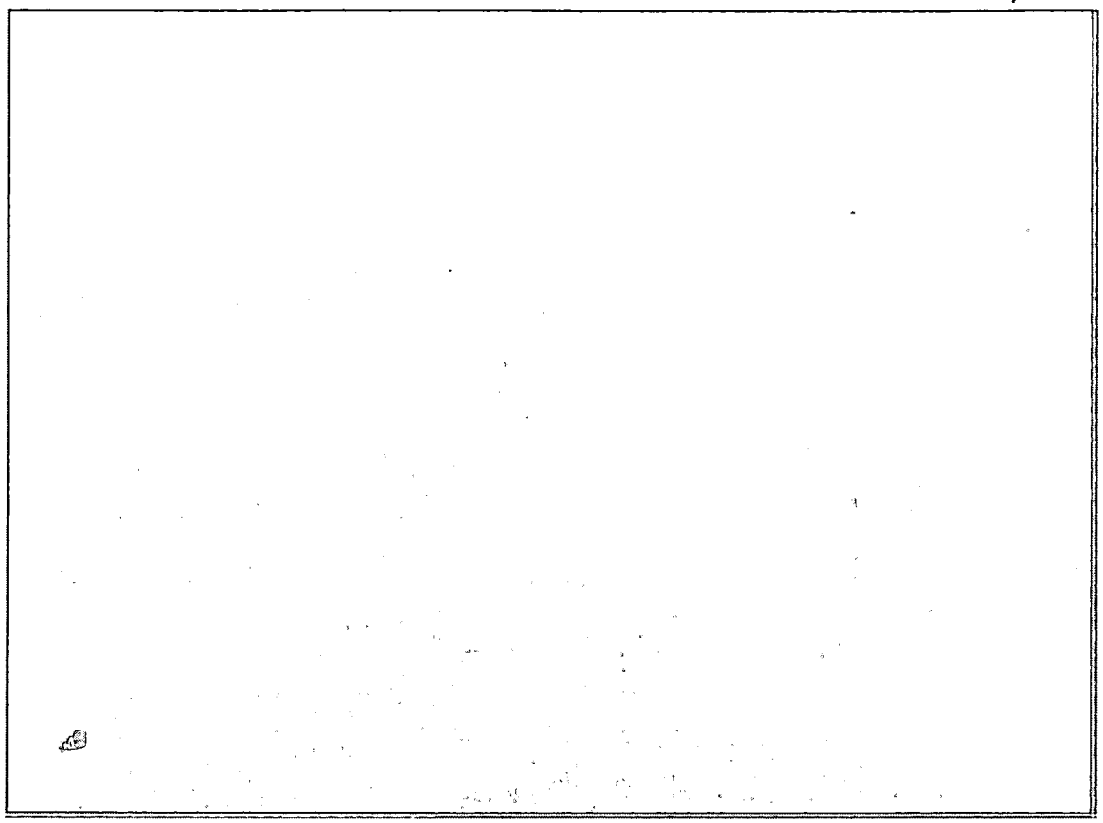
Figure 3D:
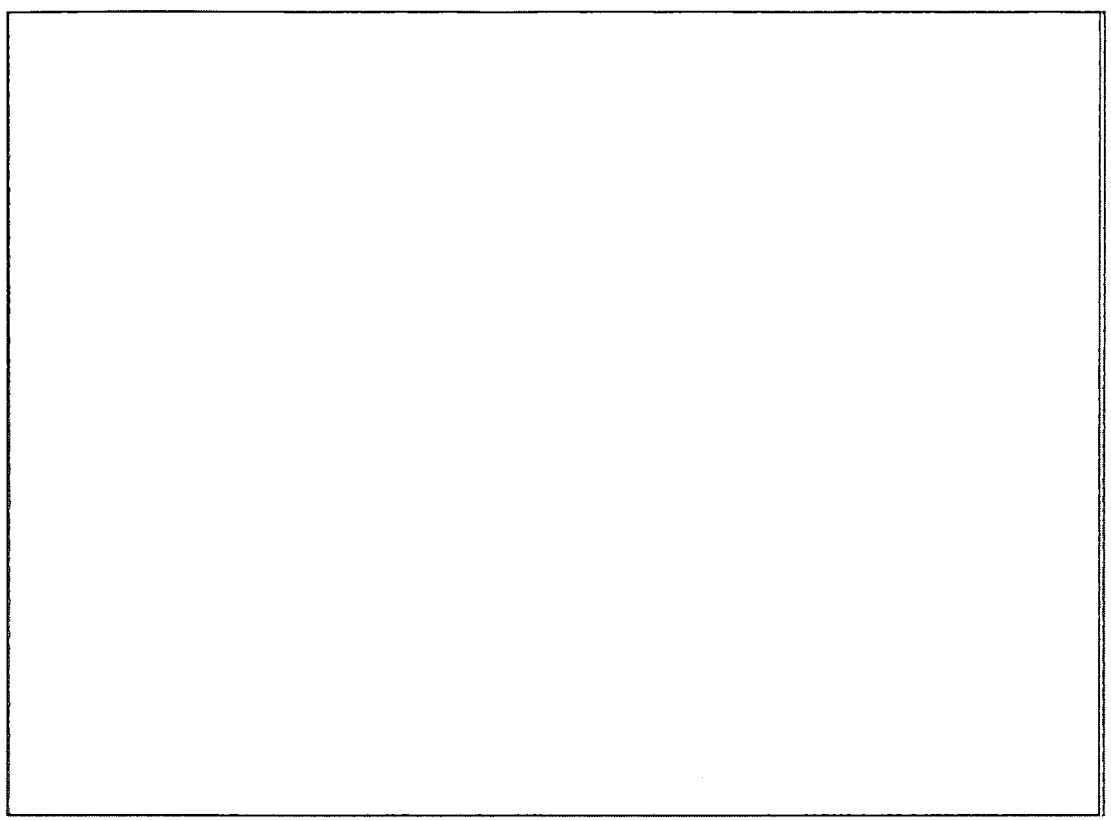
Figure 3E:
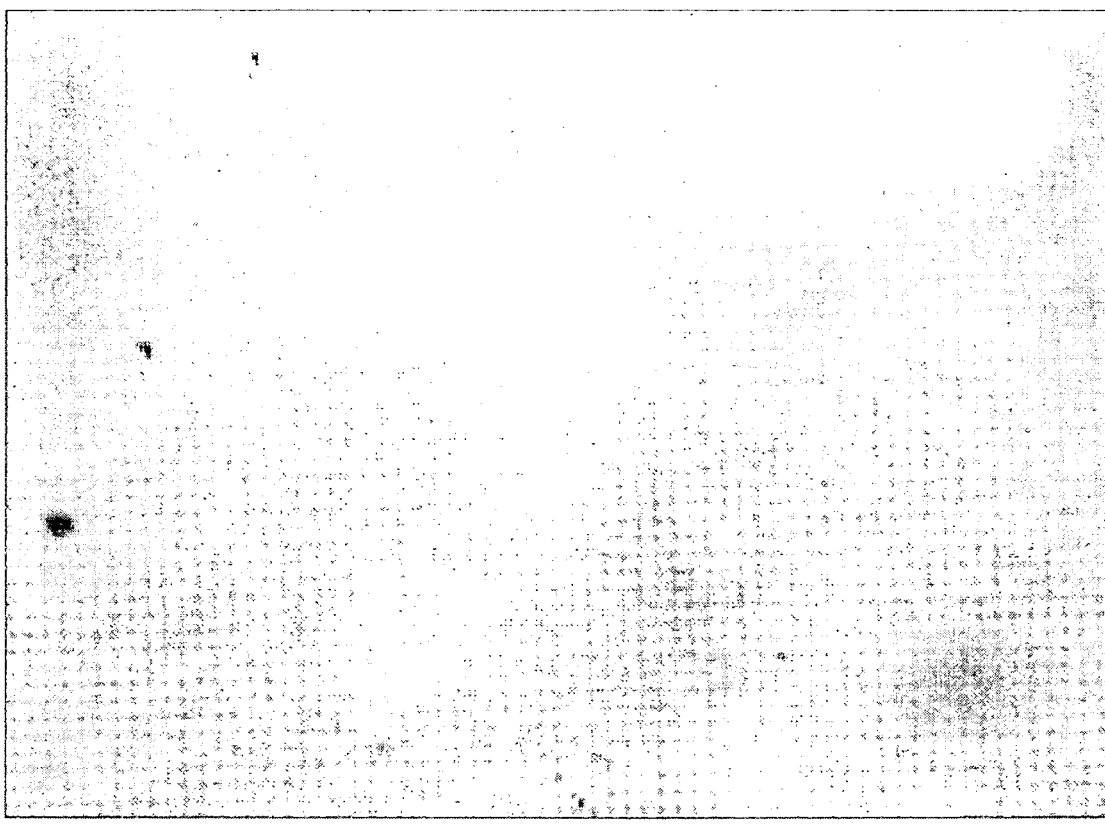
Figure 3F:
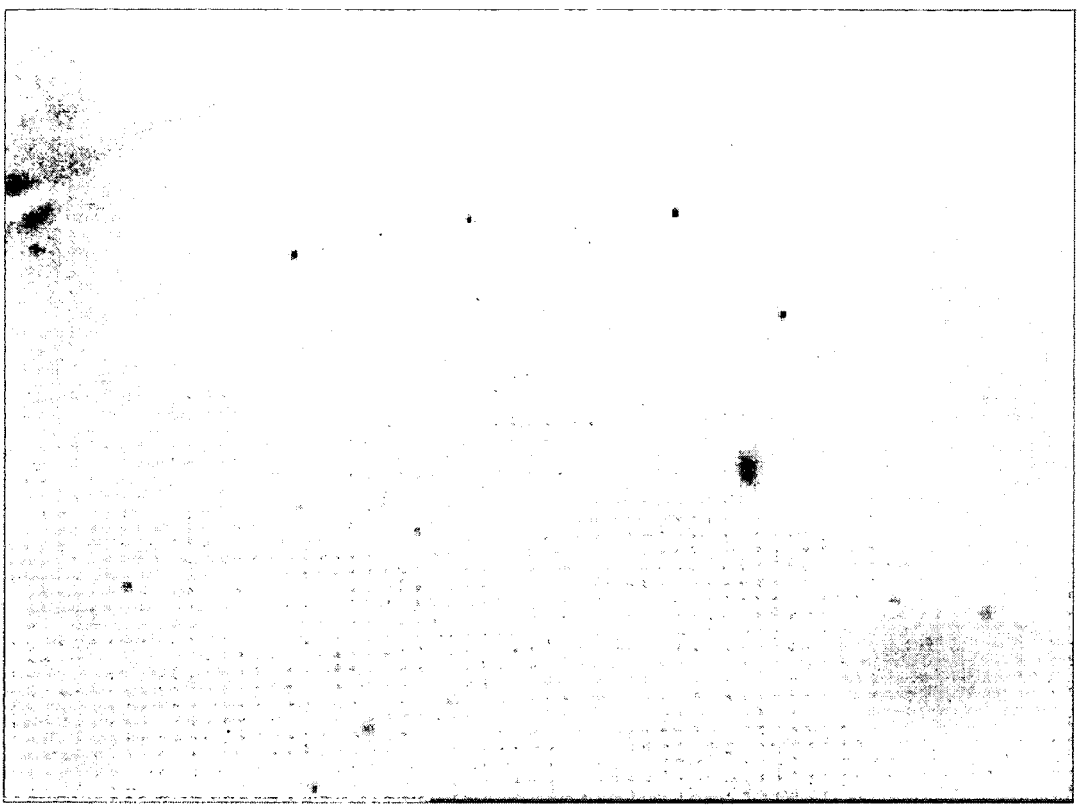

FIGS. 3E to 3H show a brightness of an LCD device when 3 V was applied to the LCD device. The LCD devices in FIGS. 3E to 3H correspond to the LCD devices in FIGS. 3A to 3D, respectively. Referring to FIGS. 3E and 3F, a liquid crystal molecule is horizontally aligned in response to a voltage applied to the liquid crystal molecule so that LCD devices become bright. A brightness of the LCD devices may be uniform. Thus, a liquid crystal molecule moves in a predetermined direction. When a liquid crystal molecule moves in an arbitrary direction, a brightness of the LCD devices may not be uniform.

Figure 3G:
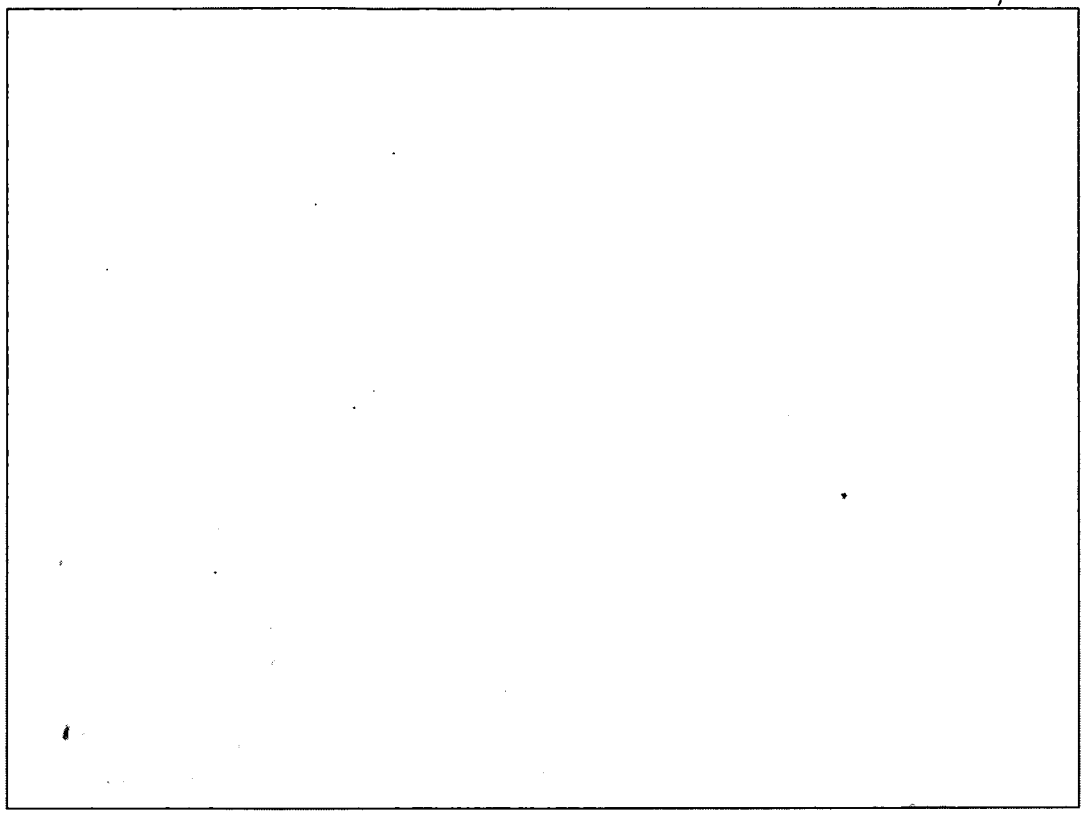
Figure 3H:
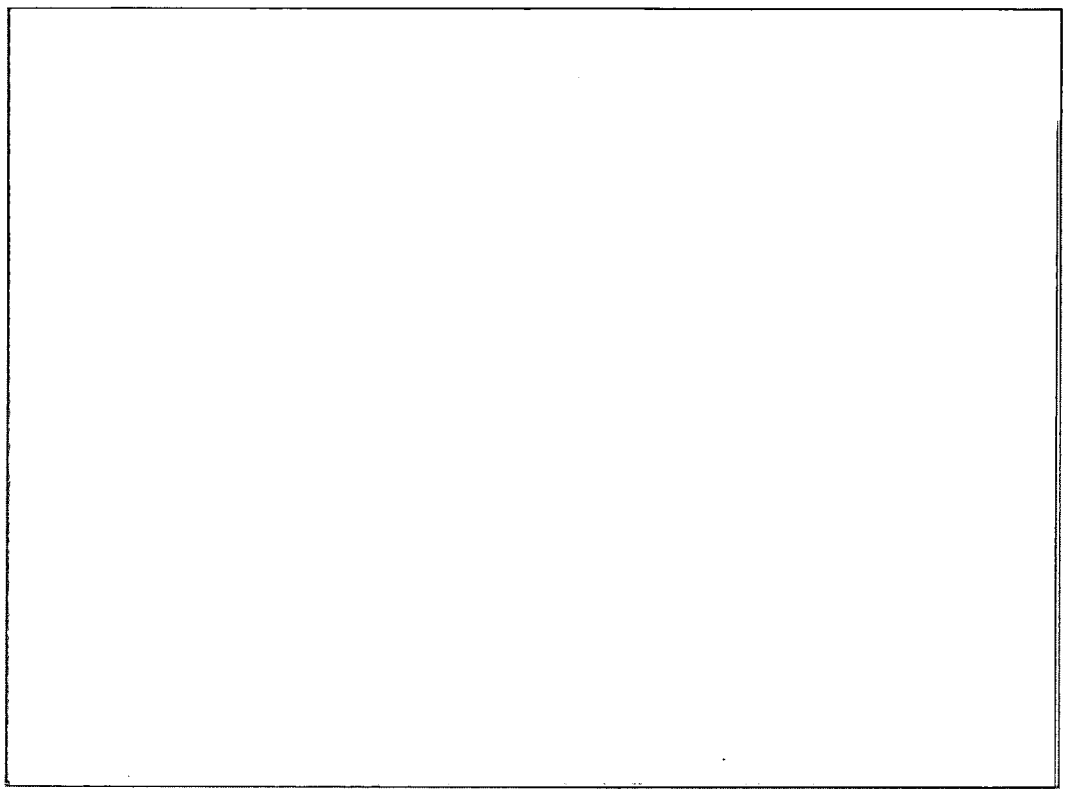

Referring to FIGS. 3G and 3H, a liquid crystal molecule is horizontally aligned before a voltage is applied to the liquid crystal molecule. Thus, a brightness difference between before and after a voltage is applied to the liquid crystal molecule is nearly zero.

Figure 4:
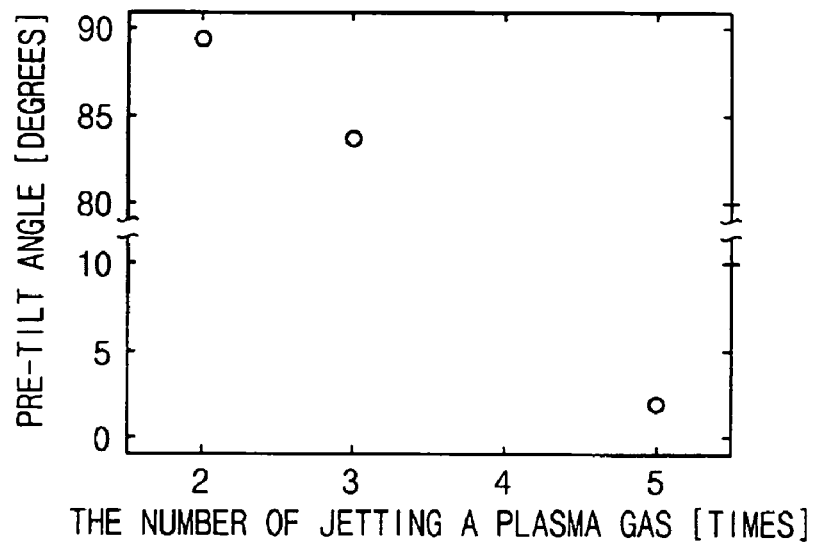
FIG. 4 is a graph showing an exemplary embodiment of a pretilt angle of a liquid crystal molecule in the LCD devices in FIGS. 3A to 3H.

FIG. 4 is a graph showing an exemplary embodiment of a pretilt angle of a liquid crystal molecule in the LCD devices in FIGS. 3A to 3H.

Referring to FIG. 4, a pretilt angle of a liquid crystal molecule in the LCD device decreased when the number of plasma gas sprays increased. A degree of an alignment layer transformation from a vertical alignment to a horizontal alignment is raised when the number of plasma gas sprays increases. Thus, an alignment layer having horizontal alignment characteristics may be formed by adjusting spraying conditions, such as the number of plasma gas sprays, etc.

Particularly, when the number of plasma gas sprays increased from 2 to 3 or 5, the pretilt angle of the liquid crystal molecule decreased from about 89.38 degrees to about 83.73 degrees or about 1.95 degrees. A pretilt angle of an alignment layer of which a surface is treated with plasma gas may be adjusted by varying spraying conditions, such as the number of plasma gas sprays, a discharging intensity of plasma, a releasing pressure, a moving velocity of a substrate, etc.

A surface-anchoring energy for a liquid crystal molecule in the LCD device corresponding to FIG. 3E is about $14.9 \times 10^{-5}$ J/m$^2$, and a surface-anchoring energy for a liquid crystal molecule in the LCD device corresponding to FIG. 3F is about $12.9 \times 10^{-5}$ J/m$^2$. A surface-anchoring energy for a liquid crystal molecule in a comparative LCD device having an alignment layer rubbed is about $16.3 \times 10^{-5}$ J/m$^2$. Since the surface-anchoring energies may vary in response to spraying conditions, the number of plasma gas sprays may vary in response to spraying conditions.

Figure 5:
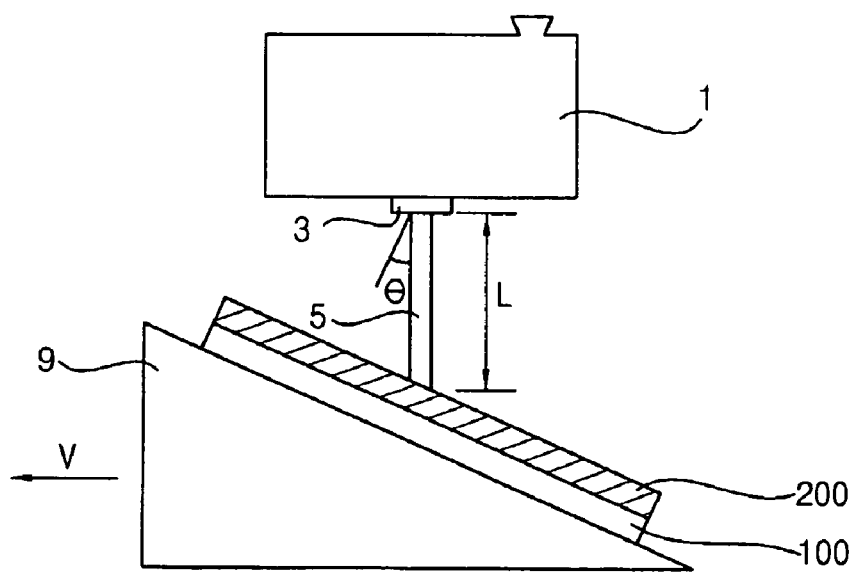
FIG. 5 is a cross-sectional view illustrating an exemplary embodiment of an apparatus for forming plasma gas and a substrate, which are disposed for measuring alignment characteristics varying according to a spraying distance.
Figure 6:
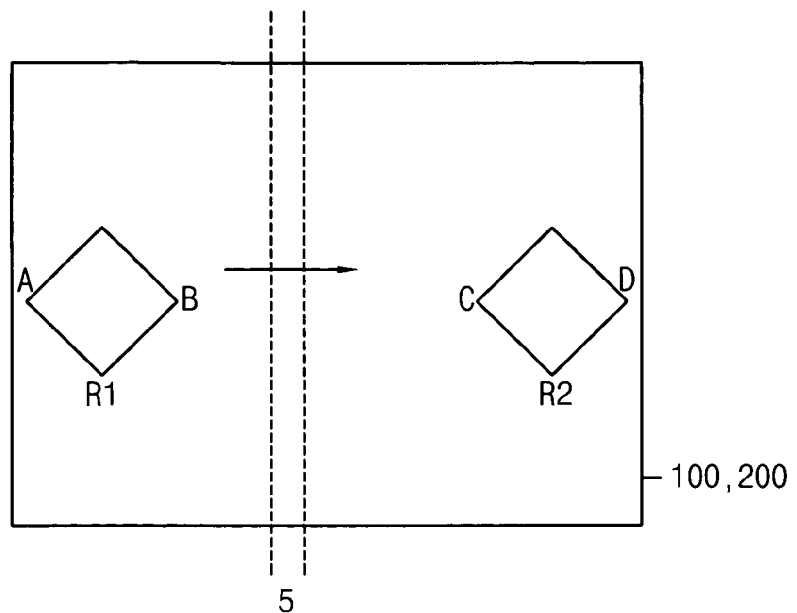
FIG. 6 is a plan view illustrating an exemplary embodiment of an alignment layer for explaining alignment characteristics of a liquid crystal molecule.

FIG. 5 is a cross-sectional view illustrating an exemplary embodiment of an apparatus for forming plasma gas and a substrate, which are disposed for measuring alignment characteristics varying according to a spraying distance. FIG. 6 is a plan view illustrating an exemplary embodiment of an alignment layer for explaining alignment characteristics of a liquid crystal molecule.

Referring to FIGS. 5 and 6, an apparatus 1 for forming plasma gas 5 and a substrate 100 are substantially the same as the apparatus 1 for forming plasma gas 5 and the substrate 100, which are illustrated in FIG. 1, except that the substrate 100 is inclined. The substrate is disposed on an inclined base 9. A spraying distance L corresponding to a first area R1 is smaller than a spraying distance L corresponding to a second area R2.

As in the illustrated embodiment, spraying angle θ between a direction perpendicular to an upper surface of the substrate 100 and a spraying direction of the plasma gas 5 is about 17 degrees. Spraying conditions, such as a source gas of plasma gas, are substantially the same as the spraying conditions of the spraying plasma gas explained in FIG. 3, except for the spraying angle. When a spraying angle is about 17 degrees, about 1,000 micrometers (µm) of a distance difference along a length the upper surface of the substrate 100 corresponds to about 300 µm of a spraying distance difference.

Figure 7A:
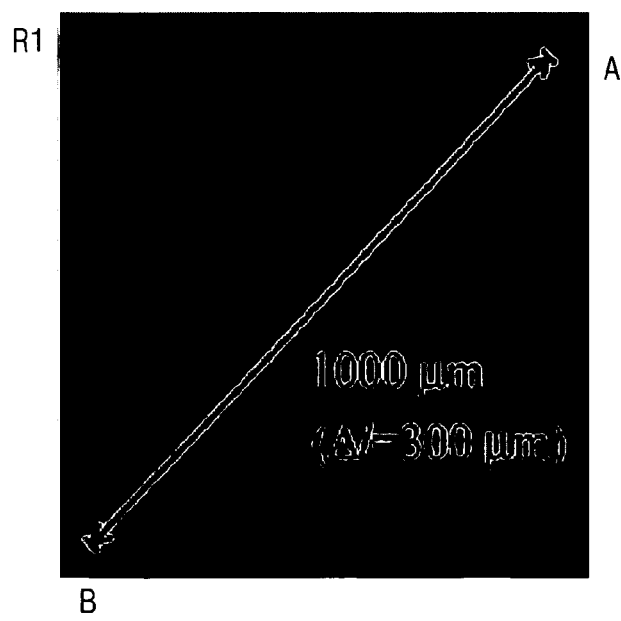
FIG. 7A is a photograph showing an exemplary embodiment of a brightness of an area 'R1' illustrated in FIG. 6 when 0 V is applied to an LCD device.
Figure 7B:
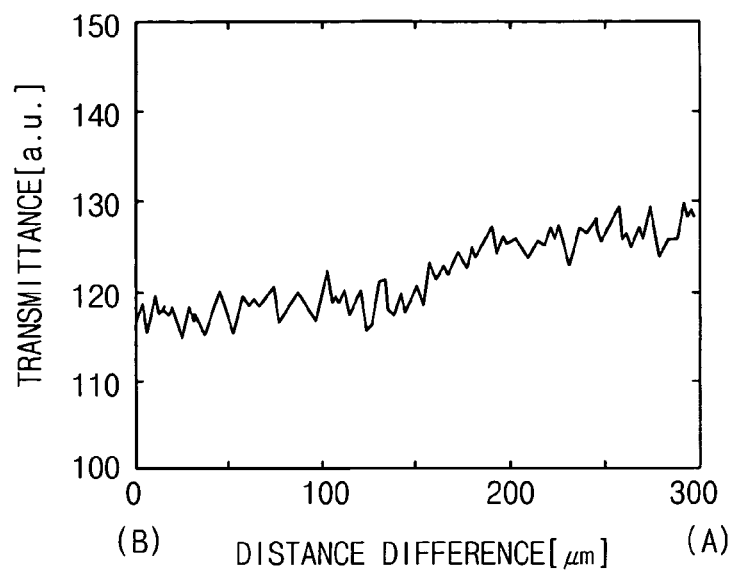
FIG. 7B is a graph illustrating an exemplary embodiment of a transmittance of an area 'R1' illustrated in FIG. 6, which varies according to a spraying distance.
Figure 8A:
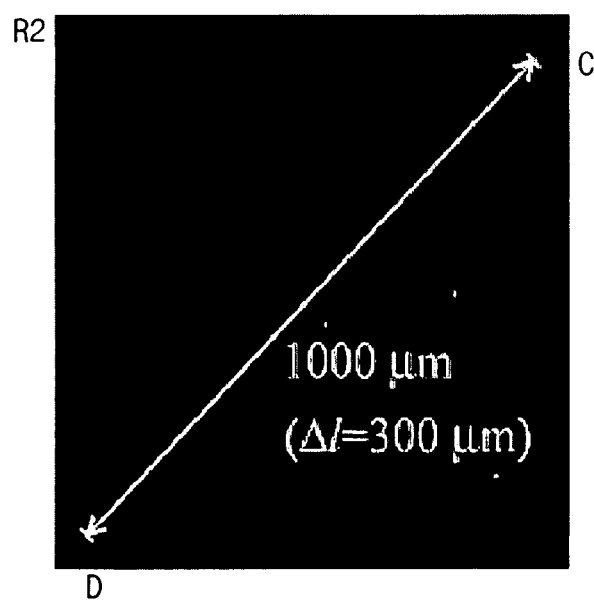
FIG. 8A is a photograph showing an exemplary embodiment of a brightness of an area 'R2' illustrated in FIG. 6 when 0 V is applied to an LCD device.
Figure 8B:
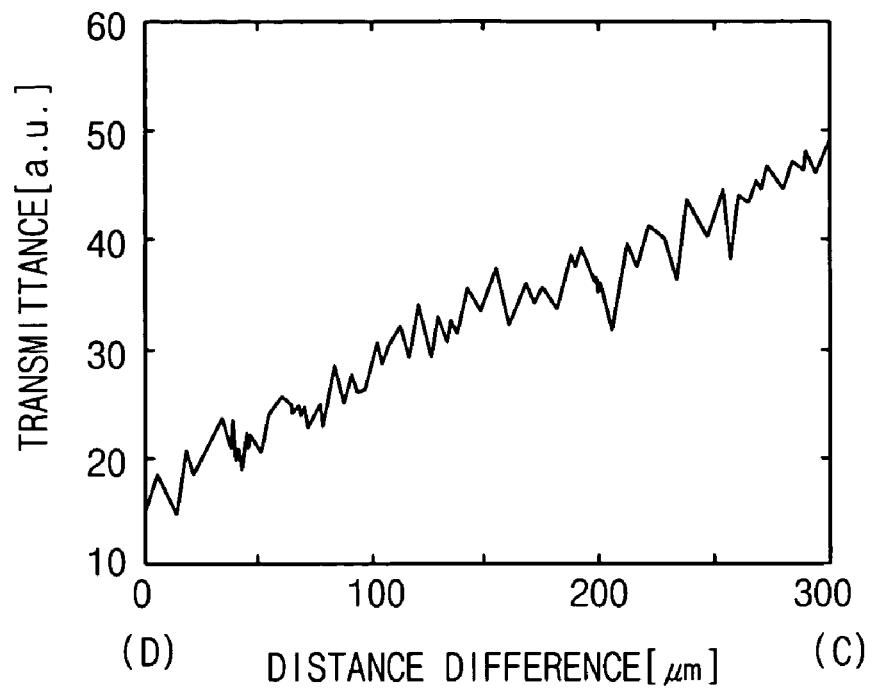
FIG. 8B is a graph illustrating an exemplary embodiment of a transmittance of the area 'R2' illustrated in FIG. 6, which varies according to a spraying distance.

FIG. 7A is a photograph showing an exemplary embodiment of a brightness of the first area R1 illustrated in FIG. 6 when 0 V is applied to an LCD device. FIG. 7B is a graph illustrating an exemplary embodiment of a transmittance of the first area R1 illustrated in FIG. 6, which varies according to a spraying distance. FIG. 8A is a photograph showing an exemplary embodiment of a brightness of the second area R2 illustrated in FIG. 6 when 0 V is applied to an LCD device. FIG. 8B is a graph illustrating an exemplary embodiment of a transmittance of the second area R2 illustrated in FIG. 6, which varies according to a spraying distance. The LCD device includes the above-mentioned backlight unit and the polarizing plates.

Referring to FIGS. 7A to 8B, the first area R1 is brighter than the second area R2 of which a spraying distance is greater than a spraying distance of the second area R2. Thus, when a spraying distance decreases, an angle between a liquid crystal molecule and a surface of the alignment layer increases.

Referring to FIG. 7B, a spraying distance difference between an area 'A' and an area 'B' is about 300 µm, and a transmittance of the area 'A' is greater than a transmittance of the area 'B'. Thus, a liquid crystal molecule in the area 'A' is aligned nearly horizontally in comparison with a liquid crystal molecule in the area 'B'. Referring to FIG. 8B, a spraying distance difference between an area 'C' and an area 'D' is about 300 µm, and a transmittance of the area 'C' is greater than a transmittance of the area 'D'. Thus, a liquid crystal molecule in the area 'C' is aligned nearly horizontally in comparison with a liquid crystal molecule in the area 'D'.

A transmittance difference between the area 'C' and the area 'D' is greater than a transmittance difference between the area 'A' and the area 'B', the spraying distances of areas 'A' and 'B' being smaller than spraying distances of the area 'C' and the area 'D'.

In FIGS. 7A to 8B, the transmittances are represented as arbitrary units and are used for representing relative difference between the transmittances.

Figure 9A:
FIGS. 9A to 10B are cross-sectional views illustrating exemplary embodiments of an alignment layer on which a liquid crystal molecule has a pretilt angle through treating of a surface of the alignment layer with plasma gas.
Figure 9B:
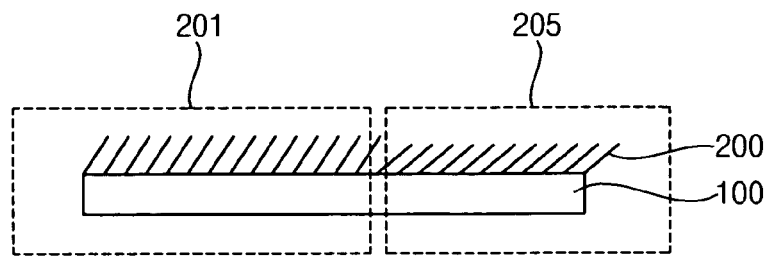
Figure 10A:
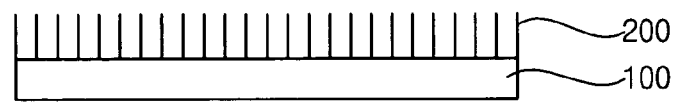
Figure 10B:
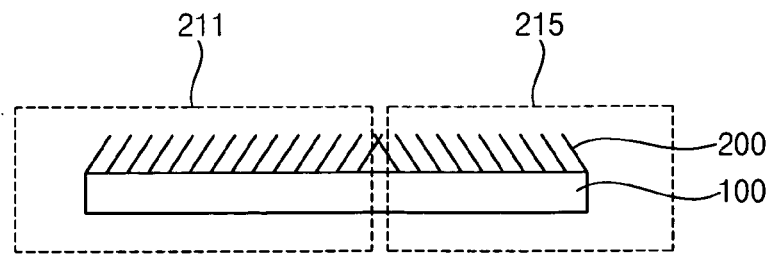

FIGS. 9A to 10B are cross-sectional views illustrating exemplary embodiments of an alignment layer on which a liquid crystal molecule has a pretilt angle through treating of a surface of the alignment layer with plasma gas. FIGS. 9A and 10A are cross-sectional views illustrating an alignment layer before treating a surface of the alignment layer with plasma gas. FIGS. 9B and 10B are cross-sectional views illustrating an alignment layer after treating a surface of the alignment layer with plasma gas.

Referring to FIGS. 9A to 10B, an alignment layer 200 on which liquid crystal molecules have pretilt angles different from each other may be formed by varying spraying conditions. As illustrated in FIG. 9B, an alignment layer 200 includes a first area 201, on which a liquid crystal molecule has a relatively large pretilt angle, and a second area 205, on which a liquid crystal molecule has a relatively small pretilt angle. As illustrated in FIG. 10B, an alignment layer 200 includes a first area 211, on which a liquid crystal molecule has a first alignment direction, and a second area 215, on which a liquid crystal molecule has an alignment direction different from the first alignment direction. In alternative exemplary embodiments, pretilt angle and/or alignment direction may be substantially the same across multiple areas of the alignment layer 200 or may vary between the multiple areas.

FIGS. 11 to 15 are cross-sectional views and a perspective view illustrating exemplary embodiments of methods of spraying plasma gas for forming an alignment layer having a pretilt angle.

An alignment layer 200 is disposed on a substrate 100 and a surface of the alignment layer 200 is treated with plasma gas 5. Spraying conditions of the plasma gas 5 may be adjusted by varying a disposition and/or a direction of a releasing part 3, etc. Spraying conditions of the plasma gas 5 may also be adjusted using masks 300, 305 and 310.

Figure 11:
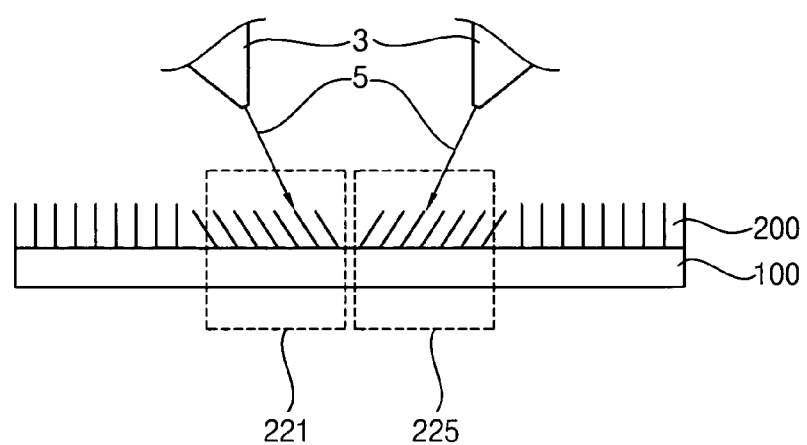
FIGS. 11 to 15 are cross-sectional views and a perspective view illustrating exemplary embodiment of methods of spraying plasma gas for forming an alignment layer having a pretilt angle.

Referring to FIG. 11, plasma gas 5 is sprayed onto an alignment layer 200 such that an alignment direction of a liquid crystal molecule on a first area 221 of the alignment layer 200 is different from an alignment direction of a liquid crystal molecule on a second area 225 of the alignment layer 200. The spraying angle of the plasma gas 5 is different in the first and second areas 221 and 225. In the illustrated embodiment, the pretilt angle is substantially the same.

Figure 12:
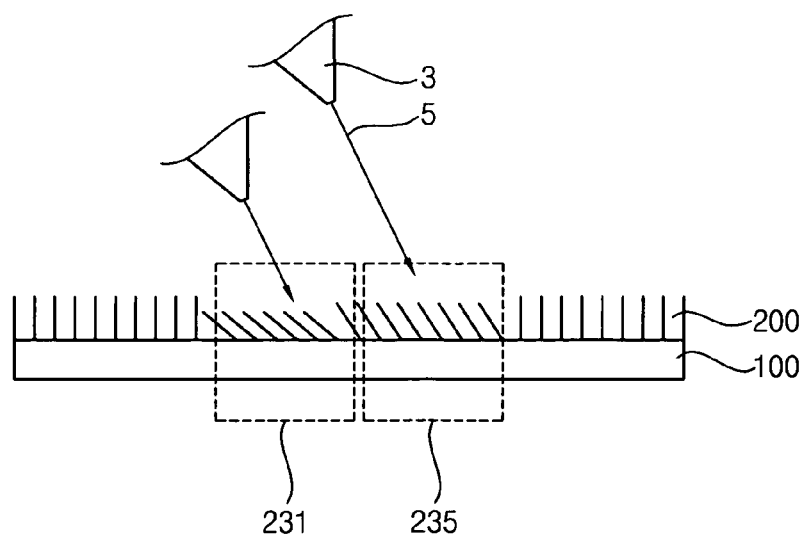

Referring to FIG. 12, plasma gas 5 is sprayed onto an alignment layer 200 such that a pretilt angle of a liquid crystal molecule on a first area 231 of the alignment layer 200 is smaller than a pretilt angle of a liquid crystal molecule on a second area 235 of the alignment layer 200. In the illustrated embodiment, the alignment direction on the first area 231 and the second area 235 are substantially the same.

Figure 13A:
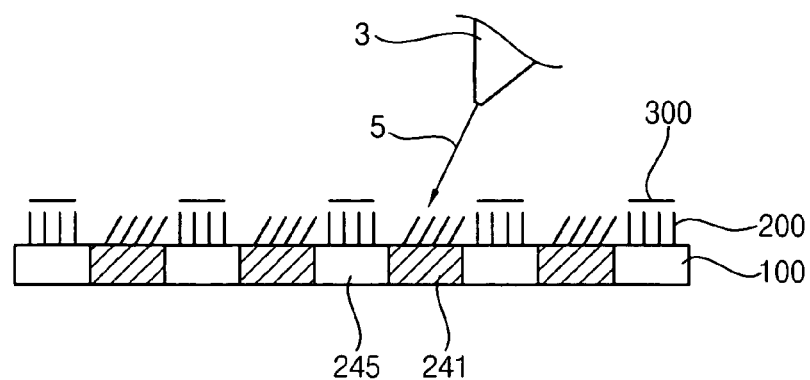
Figure 13B:
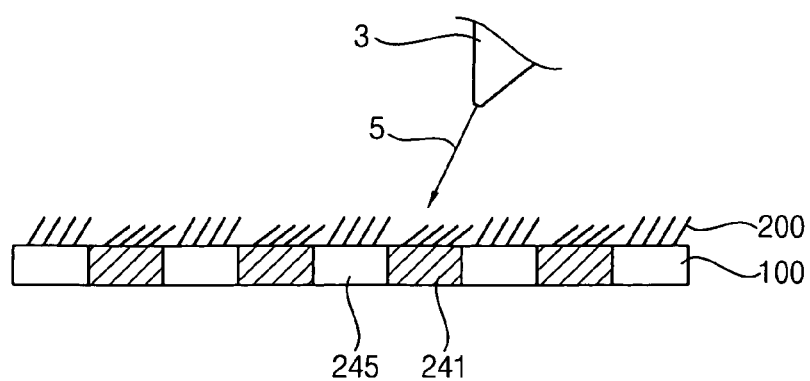

Referring to FIGS. 13A and 13B, plasma gas 5 is sprayed onto a first area 241 of an alignment layer 200 through a mask 300. Thereafter, plasma gas 5 is sprayed onto the first area 241 and a second area 245 of the alignment layer 200 as illustrated in FIG. 13B. Since the number of plasma gas sprays corresponding to the first area 241 is different from the number of plasma gas sprays corresponding to the second area 245, a pretilt angle of a liquid crystal molecule on the first area 241 is smaller than a pretilt angle of a liquid crystal molecule on the second area 245. The first and second areas 241 and 245 are exposed to an unequal number of plasma gas sprays and the area with the greater number of sprays has a smaller pretilt angle.

Figure 14A:
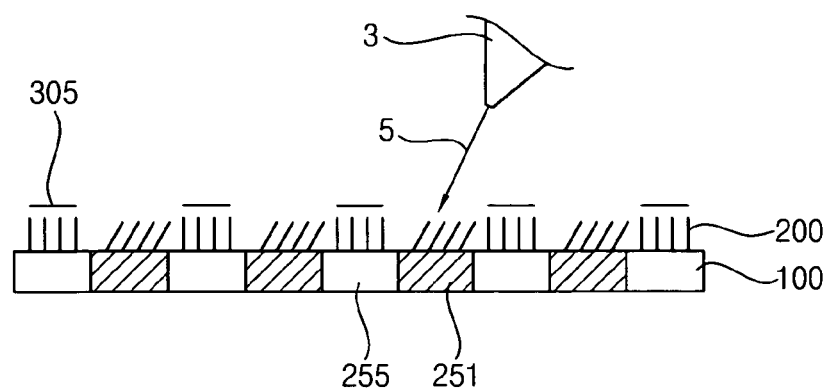
Figure 14B:
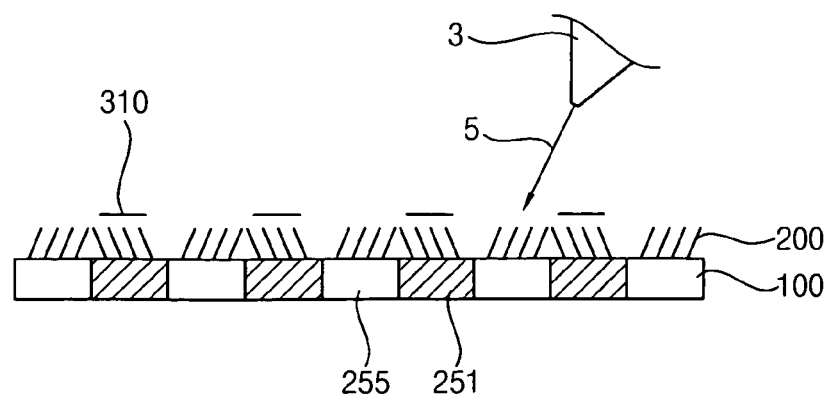

Referring to FIGS. 14A and 14B, plasma gas 5 is sprayed onto a first area 251 of an alignment layer 200 through a first mask 305. The first mask 305 corresponds to second areas 255. The substrate 100, on which the alignment layer 200 is disposed, is rotated by about 180 degrees. plasma gas 5 is sprayed onto the second areas 255 of the alignment layer 200 through a second mask 310 disposed corresponding to the first areas 251 as illustrated in FIG. 14B. A spraying direction of the first area 251 is different from a spraying direction of the second area 255. An alignment direction of a liquid crystal molecule on the first area 251 is different from an alignment direction of a liquid crystal molecule on the second area 255. Based on the number of sprays being the same, the pretilt angle is substantially the same in the first areas 251 and the second areas 255 as illustrated in FIG. 14B. In an exemplary embodiment, spraying of the plasma gas 5 on all areas of the alignment layer 200 may follow the spraying of the plasma gas 5 using a mask.

Figure 15:
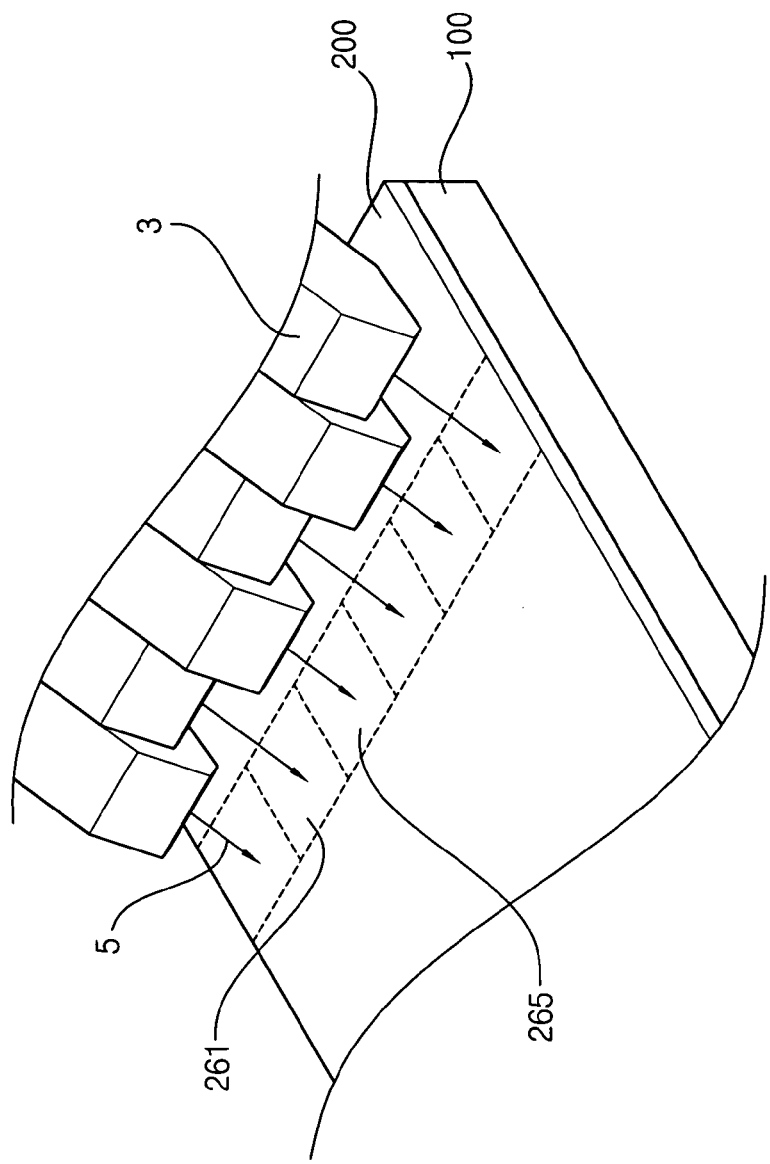

Referring to FIG. 15, multiple releasing parts 3 are disposed at different spraying distances from the alignment layer 200. A spraying distance of a first area 261 of an alignment layer 200 is different from a spraying distance of a second area 265 of an alignment layer 200. Thus, a pretilt angle of a liquid crystal molecule on the first area 261 is different from a pretilt angle of a liquid crystal molecule on the second area 265.

FIGS. 16A to 17B are cross-sectional views illustrating exemplary embodiments of an LCD device wherein a liquid crystal molecule in the LCD device has a pretilt angle. A surface of an alignment layer of the LCD device is treated with plasma gas.

Figure 16A:
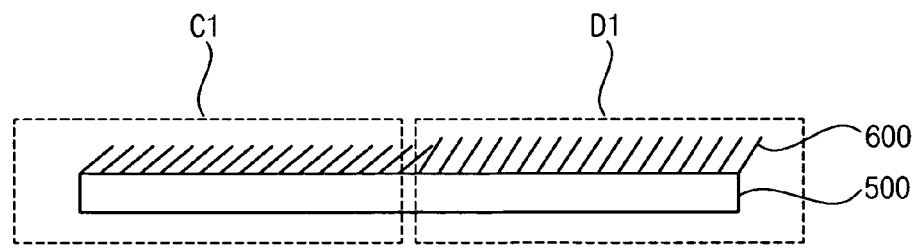
FIGS. 16A to 17B are cross-sectional views illustrating exemplary embodiments of an LCD device wherein a liquid crystal molecule in the LCD device has a pretilt angle.
Figure 16A:
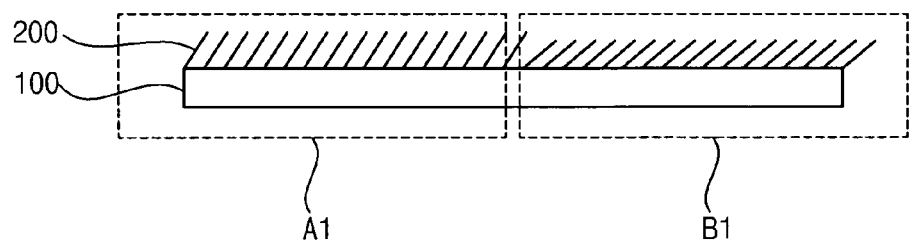

Referring to FIG. 16A, a lower alignment layer 200 treated with plasma gas is disposed on a lower substrate 100. A pretilt angle of a first area A1 of the lower substrate 100 is different from a pretilt angle of a second area B1 of the lower substrate 100. In the illustrated exemplary embodiment, an alignment direction of the first area A1 is substantially the same as an alignment direction of the second area B1 and a pretilt angle of the first area A1 is greater than a pretilt angle of the second area B1. In an exemplary embodiment, both the first area A1 and the second area B1 may be included in one pixel. In an alternative exemplary embodiment, the first area A1 may be included in a first pixel, and the second area B1 may be included in a second pixel adjacent to the first pixel.

An upper alignment layer 600 treated with plasma gas is disposed on an upper substrate 500. A pretilt angle of a third area C1 of the upper substrate 500 is different from a pretilt angle of a fourth area D1 of the upper substrate 500. The third area C1 corresponds to the first area A1 of the lower substrate 100 and the fourth area D1 corresponds to the second area B1 of the lower substrate 100. In the illustrated exemplary embodiment, an alignment direction of the first area A1 is substantially the same as an alignment direction of the second area B1, and a pretilt angle of the first area A1 is greater than a pretilt angle of the second area B1. In alternative exemplary embodiments, alignment directions of each of the first to fourth areas A1, B1, C1 and D1 may be substantially the same as each other or be different from each other.

Figure 16B:
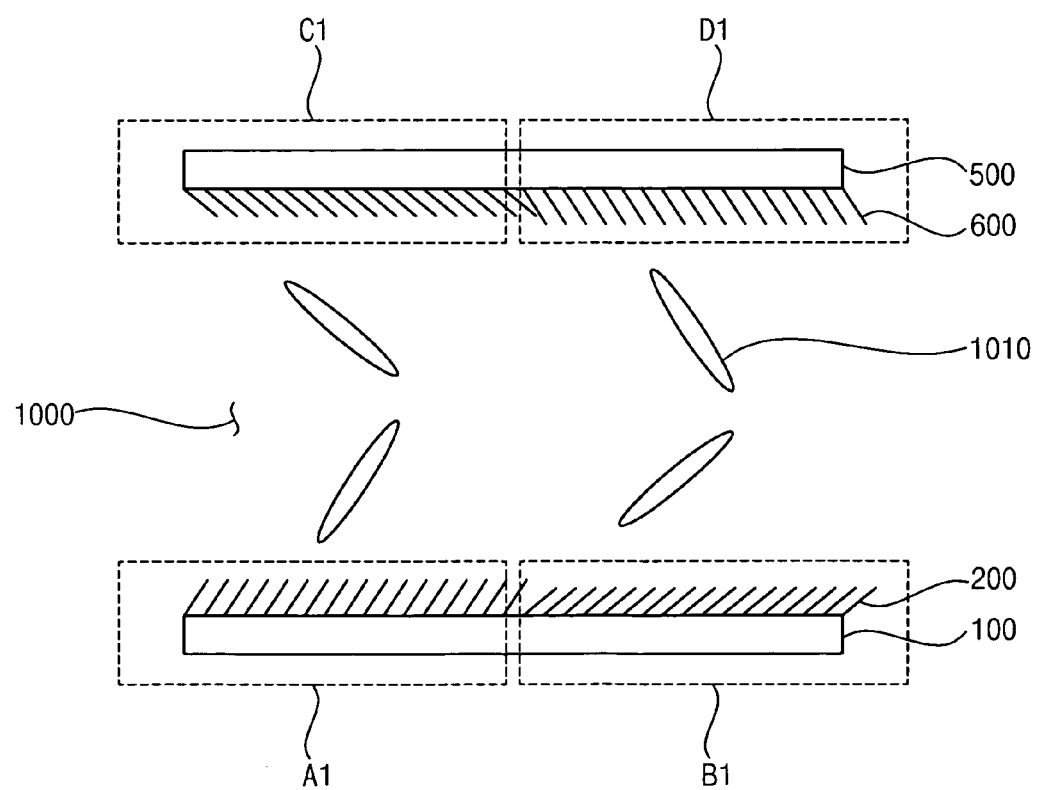

Referring to FIG. 16B, a liquid crystal layer 1000 is disposed between the upper substrate 500 and the lower substrate 100. A liquid crystal molecule 1010 having a pretilt angle is aligned between the lower alignment layer 200 and the upper alignment layer 600. A pretilt angle of a liquid crystal molecule between the first area A1 and the third area C1 is different from a pretilt angle of a liquid crystal molecule between the second area B1 and the third area D1. Thus, fringe-field switching may be realized.

Figure 17A:
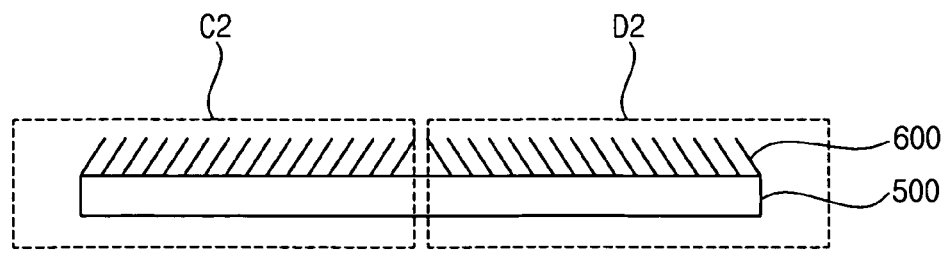
Figure 17A:
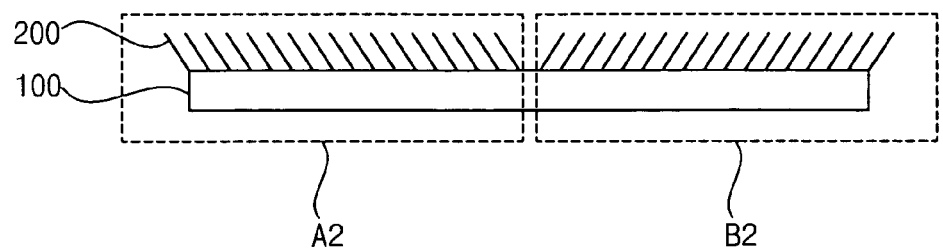

Referring to FIG. 17A, a lower alignment layer 200 treated with plasma gas is disposed on a lower substrate 100. An alignment direction of a first area A2 of the lower substrate 100 is different from an alignment direction of a second area B2 of the lower substrate 100. In an exemplary embodiment, the first area A2 and the second area B2 may be included in one pixel. In an alternative exemplary embodiment, the first area A2 may be included in a first pixel, and the second area B2 may be included in a second pixel adjacent to the first pixel.

An upper alignment layer 600 treated with plasma gas is disposed on an upper substrate 500. In the illustrated embodiment, an alignment direction of a third area C2 of the upper substrate 500 is different from an alignment direction of a fourth area D2 of the upper substrate 500. The third area C2 corresponds to the first area A2 of the lower substrate 100, and the fourth area D2 corresponds to the second area B2 of the lower substrate 100.

Figure 17B:
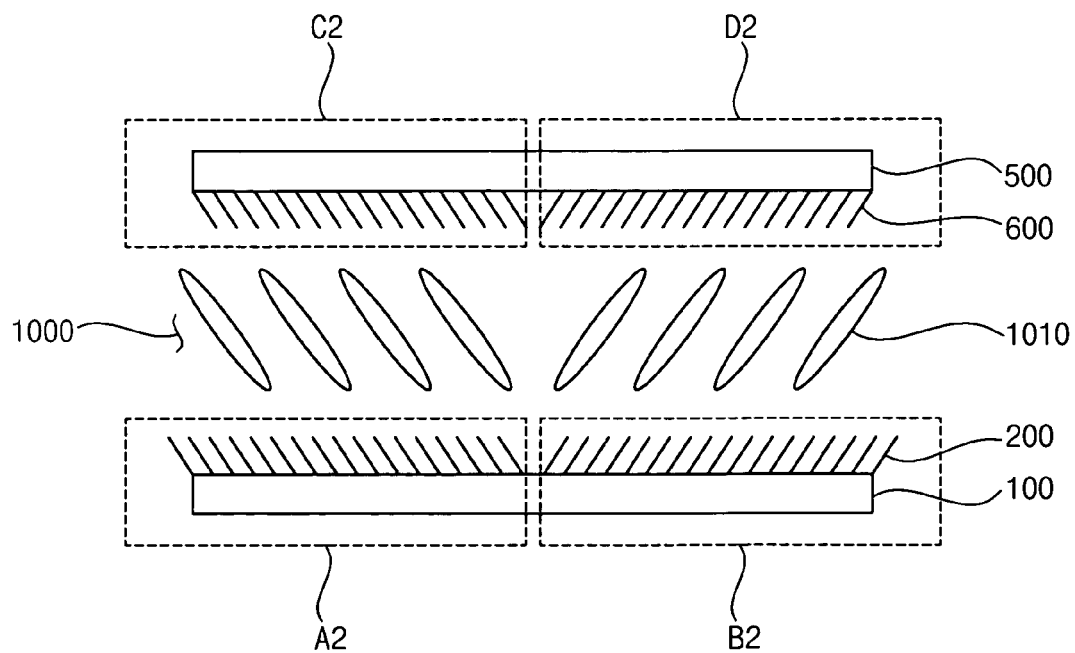

Referring to FIG. 17B, a liquid crystal layer 1000 is disposed between the upper substrate 500 and the lower substrate 100. A liquid crystal molecule 1010 having a pretilt angle is aligned between the lower alignment layer 200 and the upper alignment layer 600. An alignment direction of a liquid crystal molecule between the first area A2 and the third area C2 is different from an alignment direction of a liquid crystal molecule between the second area B2 and the third area D2. Thus, fringe-field switching may be realized.

Figure 18:
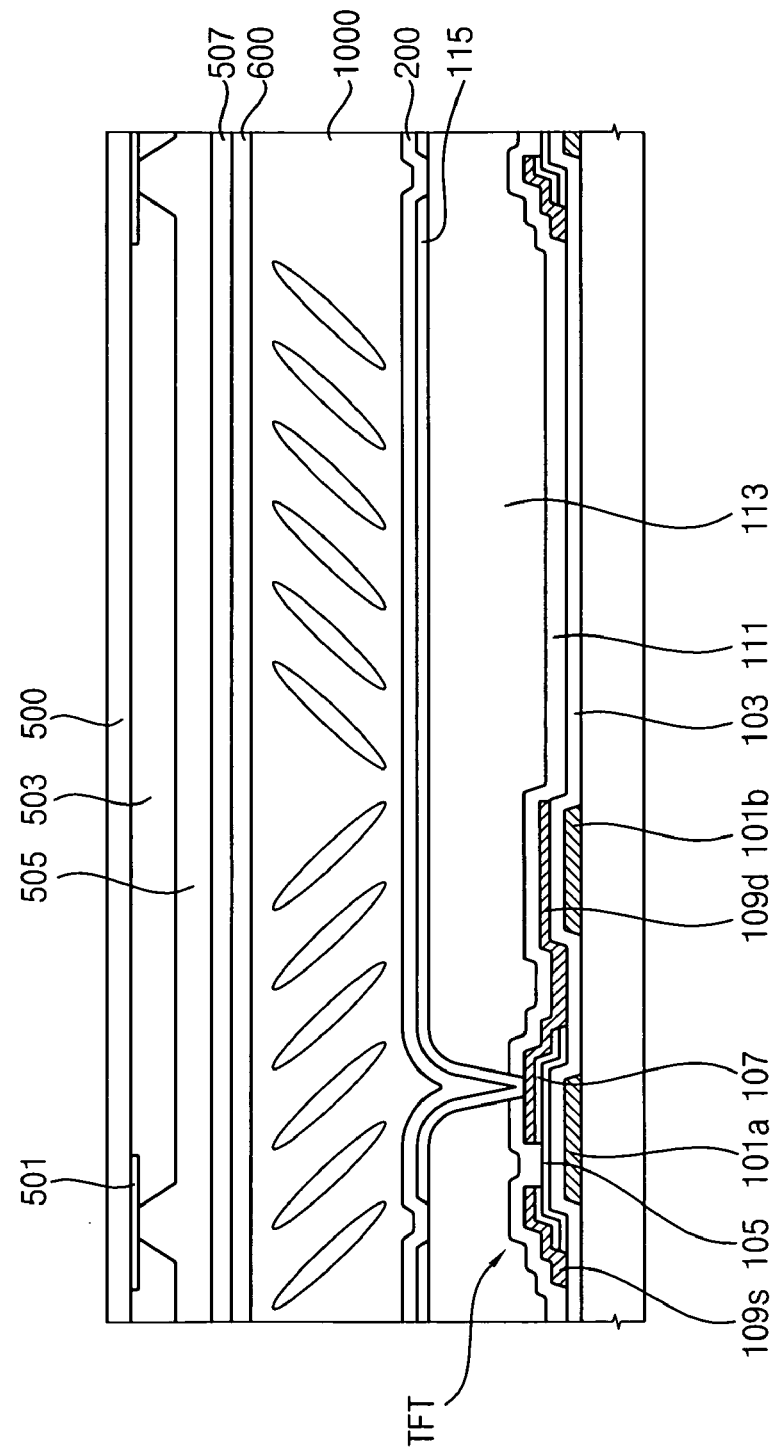
FIG. 18 is a cross-sectional view illustrating an exemplary embodiment of an LCD device manufactured according to the present invention.

FIG. 18 is a cross-sectional view illustrating an exemplary embodiment of an LCD device manufactured according to the present invention.

Referring to FIG. 18, a plurality of gate lines 101a and a plurality of storage electrode lines 101b are formed on a lower substrate 100.

A gate signal is applied to the gate line 101a, and a predetermined voltage such as a common voltage, etc. is applied to the storage electrode line 101b.

Exemplary embodiments of the gate line 101a and the storage electrode line 101b may include a material having a relatively small specific resistance, such as silver (Ag), aluminum (Al), copper (Cu), chrome (Cr), titanium (Ti), tantalum (Ta), molybdenum (Mo), an alloy thereof, etc. The gate line 101a and the storage electrode line 101b may include a single layer or a multiple layer. In an exemplary embodiment, the multiple layer may include a chrome layer/aluminum-neodymium alloy layer.

Side surfaces of the gate line 101a and the storage electrode line 101b are inclined with respect to the lower substrate 100 by about 30 to about 80 degrees.

A gate-insulating layer 103 is formed on the gate line 101a and the storage electrode line 101b. The gate-insulating layer 103 may include, but is not limited to, silicon nitride (SiNx).

A semiconductor layer 105 is formed on the gate-insulating layer 103. The semiconductor layer 105 may include hydrogenated amorphous silicon (a-Si).

An ohmic contact 107 is formed on the semiconductor layer 105. In an exemplary embodiment, $n^+$ impurities are implanted into a hydrogenated amorphous silicon layer at a high concentration to form the ohmic contact 107.

Side surfaces of the semiconductor layer 105 and the ohmic contact 107 are inclined with respect to the lower substrate 100 by about 30 to about 80 degrees.

A source electrode 109s and a drain electrode 109d are formed on the ohmic contact 107 and the gate-insulating layer 103. The source electrode 109s and the drain electrode 109d are spaced apart from each other. Exemplary embodiments of the source electrode 109s and the drain electrode 109d include, but are not limited to, a metal such as silver (Ag), aluminum (Al), chrome (Cr), titanium (Ti), tantalum (Ta), molybdenum (Mo), an alloy thereof, etc. Side surfaces of the source electrode 109s and the drain electrode 109d are inclined with respect to the lower substrate 100 by about 30 to about 90 degrees.

A thin-film transistor (TFT) includes a gate electrode (not shown), the source electrode 109s and the drain electrode 109d. A channel layer of the TFT is formed at the semiconductor layer 105 between the source electrode 109s and the drain electrode 109d.

A protective layer 111 is formed on the TFT. A planarizing layer 113 may be formed on the protective layer 111. A pixel electrode 115 is formed on the protective layer 111 or the planarizing layer 113 and is electrically connected to the source electrode 109s. Exemplary embodiment of the pixel electrode include, but are not limited to, indium tin oxide (ITO), indium zinc oxide (IZO), etc.

A black matrix 501 and a color filter layer 503 are formed on an upper substrate 500. A planarizing layer 505 may be formed on the color filter 503. In exemplary embodiments, a common electrode 507 is formed on the color filter 503 or the planarizing layer 505.

Alignment layers 200 and 600 treated with plasma gas are disposed on the lower substrate 100 and the upper substrate 500, respectively. Each of the alignment layers 200 and 600 may include a first area and a second area. The second area may have alignment characteristics different from alignment characteristics of the first area. In an exemplary embodiment, an alignment direction of the first area may be different from an alignment direction of the second area.

FIGS. 19 to 22 are plan views illustrating exemplary embodiments of lower substrates of an LCD device manufactured according to the present invention.

Figure 19:
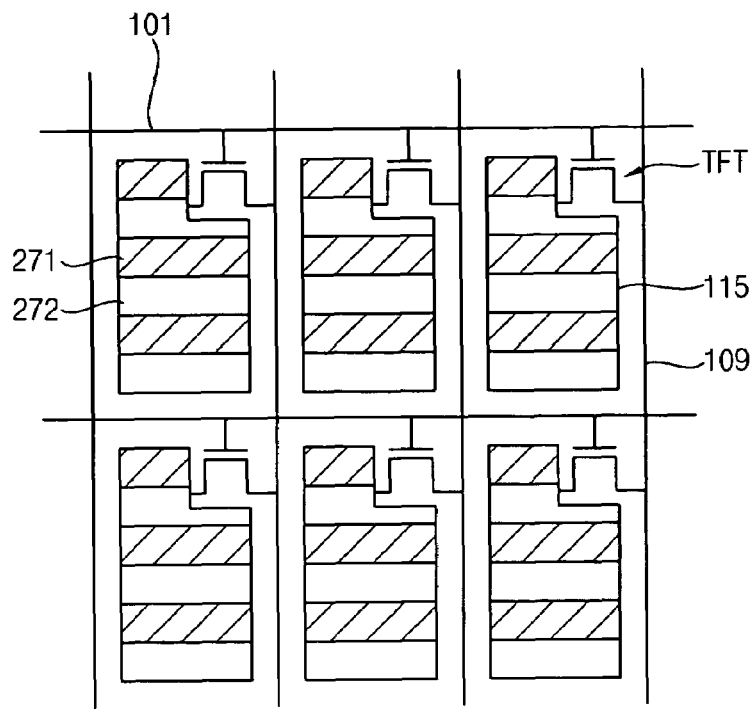
FIGS. 19 to 22 are plan views illustrating exemplary embodiments of lower substrates of an LCD device manufactured according to the present invention.

Referring to FIG. 19, a lower substrate includes a plurality of gate lines 101 and data lines 109. In an exemplary embodiment, a pixel area may be defined by the plurality of the gate lines 101 and the data lines 109. A TFT and a pixel electrode 115 electrically connected to the TFT are disposed in the pixel area. The TFT may overlap with the gate lines 101 and/or the data lines 109.

An alignment layer (not shown) disposed on the pixel electrode 115 may be treated with plasma gas to include a first area 271 and a second area 272. The second area 272 may have alignment characteristics different from alignment characteristics of the first area 271. As in the illustrated embodiment, longitudinal directions of each of the first and second areas 271 and 272 may be substantially parallel with the gate lines 101. In an exemplary embodiment, an alignment direction of the first area 271 may be different from an alignment direction of the second area 272, and a pretilt angle of the first area 271 may be different from a pretilt angle of the second area 272. In alternative exemplary embodiments, longitudinal directions of each of the first and second areas 271 and 272 may be substantially parallel with the data line 109.

Figure 20:
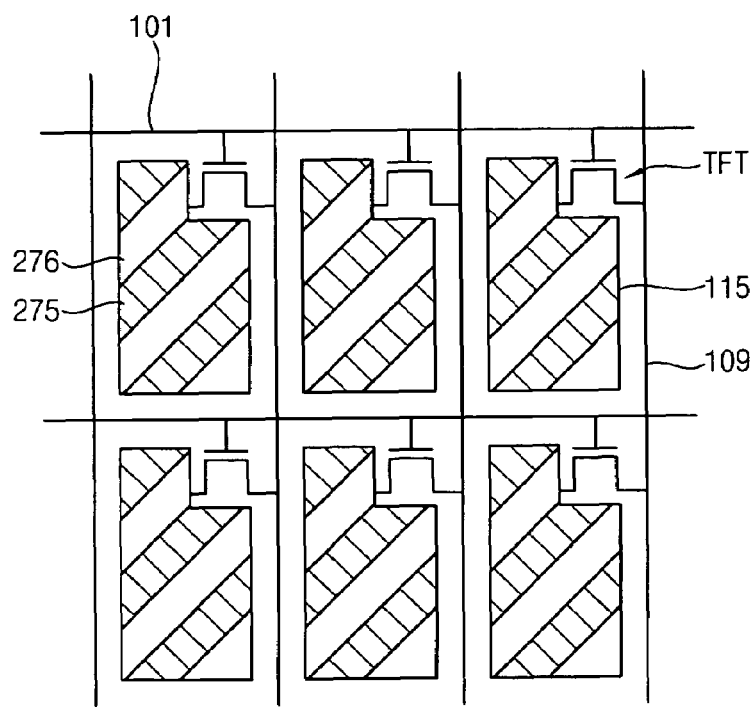

Referring to FIG. 20, an alignment layer (not shown) disposed on the pixel electrode 115 may be treated with plasma gas to include a first area 275 and a second area 276. The second area 276 may have alignment characteristics different from an alignment characteristics of the first area 275. As in the illustrated embodiment, longitudinal directions of each of the first and second areas 275 and 276 may be inclined with respect to the gate lines 101. The incline in each of the first and second areas 275 and 276 in each of the pixel electrodes 115 is shown substantially the same. In an exemplary embodiment, an alignment direction of the first area 275 may be different from an alignment direction of the second area 276, and a pretilt angle of the first area 275 may be different from a pretilt angle of the second area 276.

Figure 21:
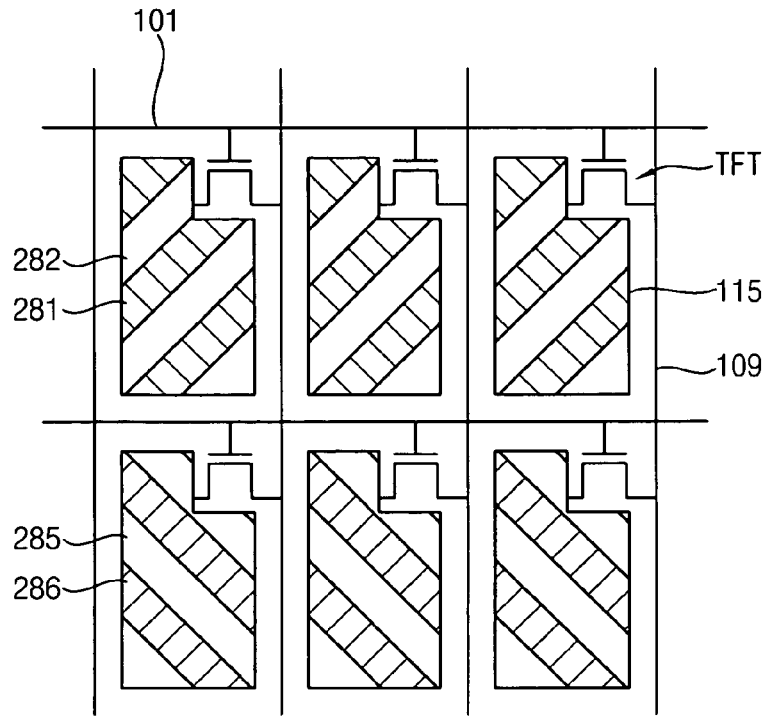

Referring to FIG. 21, an alignment layer (not shown) disposed on the pixel electrode 115 may be treated with plasma gas to include a first area 281, a second area 282, a third area 285 and a fourth area 286, which have alignment characteristics different from each other. As in the illustrated embodiment, longitudinal directions of each of the first to fourth areas 281, 282, 285 and 286 may be inclined with respect to the gate line 101 or the data line 109. The alignment direction in each of the pixel electrodes 115 may vary across the LCD device. As illustrated, alignment directions of each of the first to fourth areas 281, 282, 285 and 286 may be different from each other according to a row of the pixel electrode 115. In an exemplary embodiment, pretilt angles of each of the first to fourth areas 281, 282, 285 and 286 may be different from each other.

Figure 22:
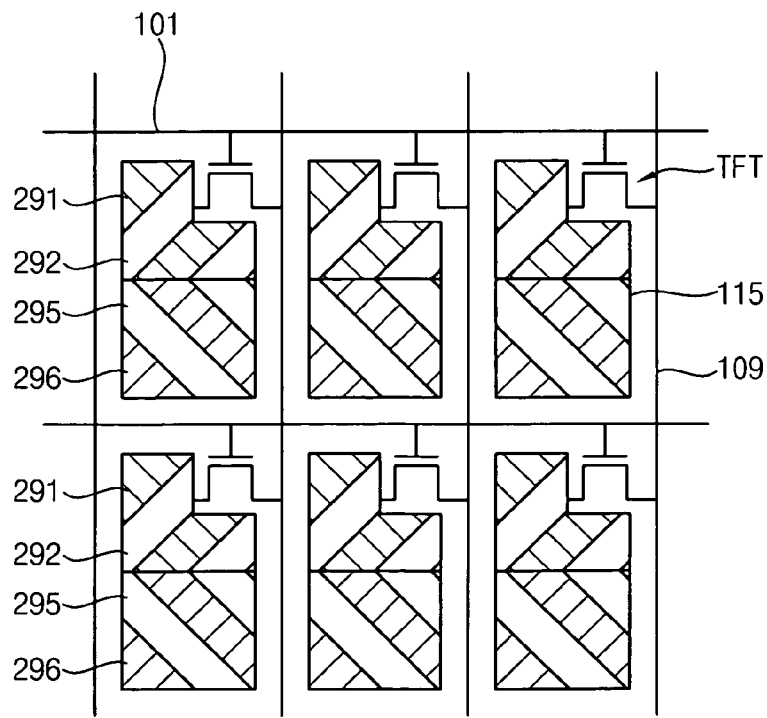

Referring to FIG. 22, an alignment layer (not shown) disposed on the pixel electrode 115 may be treated with plasma gas to include a first area 291, a second area 292, a third area 295 and a fourth area 296, which have alignment characteristics different from each other. The first and second areas 291 and 292 are formed on a first portion of the pixel electrode 115. The third and fourth areas are formed on a second portion of the pixel electrode 115.

As in the illustrated embodiment, longitudinal directions of each of the first to fourth areas 291, 292, 295 and 296 may be inclined with respect to the gate line 101 or the data line 109. Alignment directions of each of the first to fourth areas 291, 292, 295 and 296 on one pixel electrode 115 may be different from each other. As illustrated, alignment direction in the first portion of the pixel electrode 115 are different that the alignment direction in the second portion of the pixel electrode 155. The alignment direction in each of the pixel electrodes 115 and/or within each of the pixel portions may vary across the LCD device. In an exemplary embodiment, pretilt angles of each of the first to fourth areas 291, 292, 295 and 296 may be different from each other.

In the illustrated exemplary embodiments, plasma gas is sprayed onto a substrate under atmospheric pressure to form an alignment layer without a rubbing cloth making direct contact with the substrate. The above described embodiment of alignment methods may be rapid and easy. The methods may be used in a large-size alignment process. Static electricity and/or impurities may be reduced or effectively prevented. The method may be capable of adjusting spraying conditions of plasma gas to control a pretilt angle of a liquid crystal molecule between a vertical alignment and a horizontal alignment. The method may be capable of embodying a multi-domain alignment.

Although the example embodiments of the present invention have been described, it is understood that the present invention should not be limited to these example embodiments but various changes and modifications can be made by one ordinary skilled in the art within the spirit and scope of the present invention as hereinafter claimed.

What is claimed is:

1. A method of manufacturing an LCD device, the method comprising:
    forming an alignment layer having a first surface characteristic on a substrate;
    spraying plasma gas onto a portion of the alignment layer under atmospheric pressure, the portion of the alignment layer having a second surface characteristic different than the first surface characteristic from the spraying plasma gas onto a portion of the alignment layer; and
    spraying the plasma gas onto all regions of the alignment layer under atmospheric pressure, the all regions of the alignment layer having a third surface characteristic different than the first surface characteristic from the spraying the plasma gas onto all regions of the alignment layer.

2. The method of claim 1,
    wherein the spraying plasma gas onto a portion of the alignment layer comprises disposing a mask on the substrate, the mask exposing the portion of the alignment layer, and
    wherein the plasma gas is sprayed onto all regions of the alignment layer subsequent to the portion of the alignment layer being sprayed, the all regions of the alignment layer including the previously sprayed portion of the alignment layer.

3. The method of claim 2, wherein the spraying plasma gas onto a portion of the alignment layer comprises:
    spraying the plasma gas onto a first area of the alignment layer with a first mask exposing the first area; and
    spraying the plasma gas onto a second area of the alignment layer with a second mask exposing the second area;
    wherein the first area and the second area are alternately disposed on the alignment layer.

4. The method of claim 2, wherein the third surface characteristic of the portion of the alignment layer after the spraying of the plasma gas onto all regions of the alignment layer, is different than the second surface characteristic of the portion of the alignment layer.

5. The method of claim 1, wherein each of the first, second and third surface characteristics include at least one of a tilt direction and a tilt angle.

* * * * *